US008832245B2

(12) United States Patent
Karasaridis et al.

(10) Patent No.: US 8,832,245 B2
(45) Date of Patent: Sep. 9, 2014

(54) SYSTEM AND METHOD FOR CONTENT DELIVERY USING DYNAMIC REGION ASSIGNMENT

(75) Inventors: Anestis Karasaridis, Oceanport, NJ (US); Ashley Flavel, New York, NY (US); James Miros, Little Silver, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 572 days.

(21) Appl. No.: 13/107,306

(22) Filed: May 13, 2011

(65) Prior Publication Data

US 2012/0290693 A1 Nov. 15, 2012

(51) Int. Cl.

| | |
|---|---|
| ***G06F 15/16*** | (2006.01) |
| ***G06F 15/177*** | (2006.01) |
| ***G06F 15/173*** | (2006.01) |
| ***H04L 29/08*** | (2006.01) |
| ***H04L 29/12*** | (2006.01) |

(52) U.S. Cl.

CPC ........ *H04L 67/1021* (2013.01); *H04L 61/1511* (2013.01)

USPC ........... 709/222; 709/218; 709/219; 709/225; 709/238; 709/240; 709/241

(58) Field of Classification Search

CPC ........................ H04L 61/1511; H04L 67/1021

USPC ......................................................... 709/222

See application file for complete search history.

(56) References Cited

U.S. PATENT DOCUMENTS

| | | | | |
|---|---|---|---|---|
| 6,963,924 | B1 * | 11/2005 | Huang et al. | 709/238 |
| 7,032,031 | B2 * | 4/2006 | Jungck et al. | 709/246 |
| 7,146,429 | B2 * | 12/2006 | Michel | 709/238 |
| 7,260,645 | B2 * | 8/2007 | Bays | 709/238 |
| 7,447,798 | B2 * | 11/2008 | Klinker | 709/240 |
| 7,562,153 | B2 * | 7/2009 | Biliris et al. | 709/238 |
| 7,653,700 | B1 * | 1/2010 | Bahl et al. | 709/217 |
| 7,773,536 | B2 * | 8/2010 | Lloyd et al. | 370/252 |
| 7,995,504 | B2 * | 8/2011 | Ransom et al. | 370/272 |
| 8,280,998 | B2 * | 10/2012 | Joshi | 709/223 |

(Continued)

OTHER PUBLICATIONS

U.S. Appl. No. 12/645,008, filed Dec. 22, 2009.

(Continued)

*Primary Examiner* — Tauqir Hussain

*Assistant Examiner* — Angela Widhalm

(74) *Attorney, Agent, or Firm* — Akerman LLP; Michael K. Dixon; Roy P. Zachariah

(57) ABSTRACT

An authoritative domain name system server includes a memory configured to store a set of instructions, and a processor configured to execute the set of instructions. The processor obtains a first Internet Protocol address of a client system associated with a request for a domain name, and assigns a location of the authoritative domain name system server as an ingress region. The processor assigns the egress override as an egress region when the first Internet Protocol address matches the prefix of the egress override, otherwise obtains an egress table, determines a longest prefix match of the first Internet Protocol address, obtains a distance matrix for distances from the ingress location to a plurality of egress regions, and selects the egress region based on the distance matrix and the longest prefix match in the egress table. The processor selects a content node based on the one egress region, and assigns a second Internet Protocol address for the content node to a local domain name system server associated with the client system.

19 Claims, 5 Drawing Sheets

(56) References Cited

U.S. PATENT DOCUMENTS

| | | | | |
|---|---|---|---|---|
| 8,447,856 | B2 * | 5/2013 | Drako | 709/225 |
| 8,510,468 | B2 * | 8/2013 | Vange et al. | 709/238 |
| 8,549,148 | B2 * | 10/2013 | Devarapalli et al. | 709/226 |
| 2002/0038360 | A1 * | 3/2002 | Andrews et al. | 709/223 |
| 2003/0093523 | A1 * | 5/2003 | Cranor et al. | 709/225 |
| 2008/0080518 | A1 | 4/2008 | Hoeflin et al. | |
| 2009/0254638 | A1 | 10/2009 | Spatscheck et al. | |
| 2010/0125656 | A1 | 5/2010 | Karasaridis et al. | |
| 2010/0142543 | A1 | 6/2010 | Shaikh et al. | |
| 2010/0161537 | A1 | 6/2010 | Liu | |
| 2010/0162396 | A1 | 6/2010 | Liu et al. | |
| 2010/0195506 | A1 | 8/2010 | Shaikh et al. | |

OTHER PUBLICATIONS

U.S. Appl. No. 12/645,006, filed Dec. 22, 2009.

* cited by examiner

SYSTEM AND METHOD FOR CONTENT DELIVERY USING DYNAMIC REGION ASSIGNMENT

FIELD OF THE DISCLOSURE

The present disclosure generally relates to communications networks, and more particularly relates to content delivery networks.

BACKGROUND

Packet-switched networks, such as networks based on the TCP/IP protocol suite, can distribute a rich array of digital content to a variety of client applications. One popular application is a personal computer browser for retrieving documents over the Internet written in the Hypertext Markup Language (HTML). Frequently, these documents include embedded content. Where once the digital content consisted primarily of text and static images, digital content has grown to include audio and video content as well as dynamic content customized for an individual user.

It is often advantageous when distributing digital content across a packet-switched network to divide the duty of answering content requests among a plurality of geographically dispersed servers. For example, popular Web sites on the Internet often provide links to "mirror" sites that replicate original content at a number of geographically dispersed locations. A more recent alternative to mirroring is content distribution networks (CDNs) that dynamically redirect content requests to a cache server situated closer to the client issuing the request. CDNs either co-locate cache servers within Internet Service Providers or deploy them within their own separate networks.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
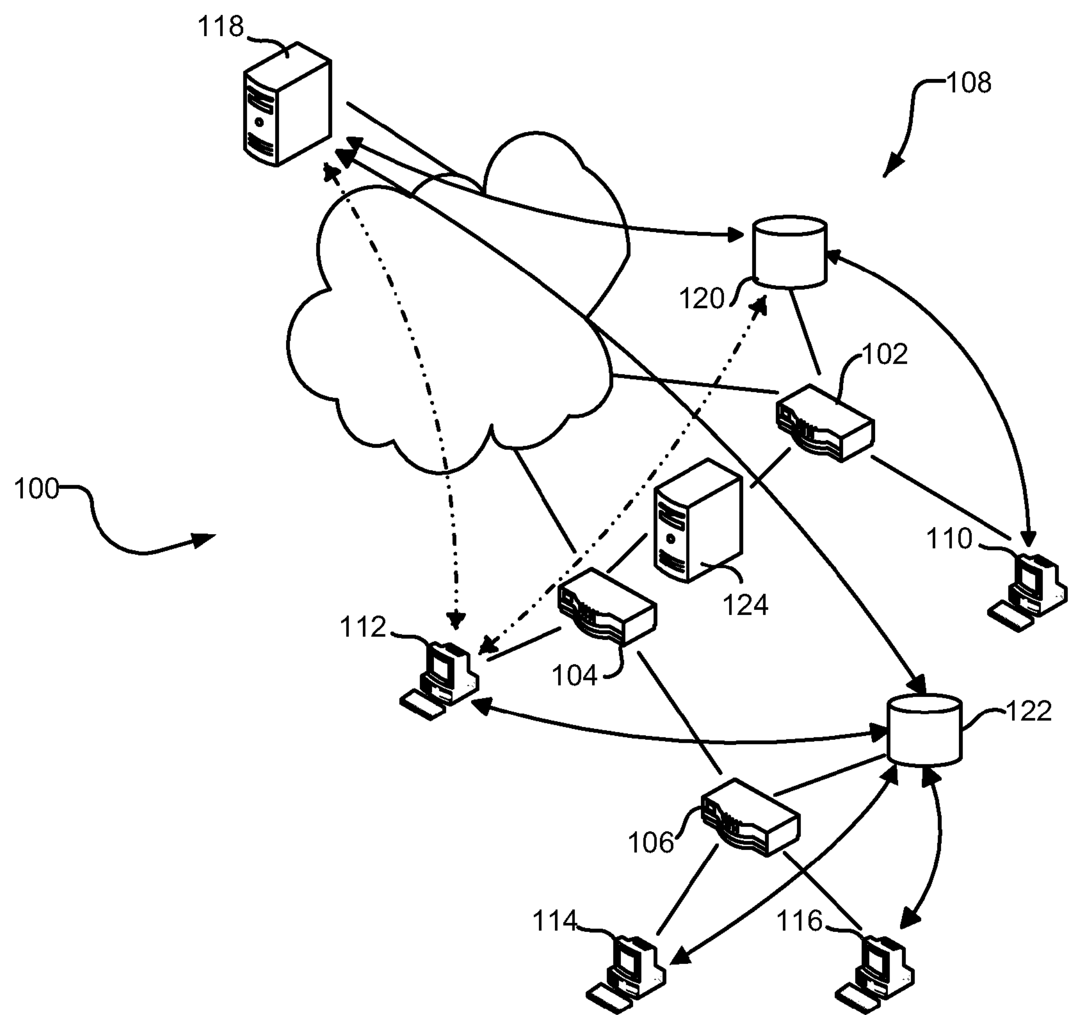
FIG. 1 is a diagram illustrating a content distribution network (CDN) in accordance with one embodiment of the present disclosure.

FIG. 1 shows a geographically dispersed network 100, such as the Internet. Network 100 can include routers 102, 104, and 106 that communicate with each other and form an autonomous system (AS) 108. AS 108 can connect to other ASs that form network 100 through peering points at routers 102 and 104. Additionally, AS 108 can include client systems 110, 112, 114, and 116 connected to respective routers 102, 104, and 106 to access the network 100.

Client systems 110, 112, 114, and 116 can retrieve information from a server 118. For example, client system 112 can retrieve a web page provided by server 118. Additionally, client system 112 may download content files, such as graphic, audio, and video content, and program files such as software updates, from server 118. The time required for client system 112 to retrieve the information from the server 118 normally is related to the size of the file, the distance the information travels, and congestion along the route. Additionally, the load on the server 118 is related to the number of client systems 110, 112, 114, and 116 that are actively retrieving information from the server 118. As such, the resources such as processor, memory, and bandwidth available to the server 118 limit the number of client systems 110, 112, 114, and 116 that can simultaneously retrieve information from the server 118.

Additionally, the network 100 can include cache servers 120 and 122 replicating content on the server 118 that can be located more closely within the network to the client systems 110, 112, 114, and 116. Cache server 120 can link to router 102, and cache server 122 can link to router 106. Client systems 110, 112, 114, and 116 can be assigned cache server 120 or 122 to decrease the time needed to retrieve information, such as by selecting the cache server closer to the particular client system. The distance between a cache server and client system can be determined by the network cost and access time. Alternatively, the distance between the cache server and the client system may be the geographic distance between the cache server and the client system.

Additionally, the network 100 can include one or more domain name system (DNS) servers 124 for assigning cache servers 120 and 122 to clients system 110 through 116. The DNS server 124 can receive a request for content from one of the client systems 110 through 116, and assign one of the cache servers 120 and 122 to the client system making the request. In an embodiment, there can be one or more local DNS servers for the client systems 110 through 116, one or more intelligent authoritative DNS servers in the AS 108, or the like.

When assigning cache servers 120 and 122 to client systems 110 through 116, the DNS server 124 can select the closest cache server to an egress point, based on an optimal network path of the CDN network 100 for that egress point. The optimal network path can be assigned after determining an ingress point, selecting the closest egress point to the ingress point, and then selecting the closest cache server 120 or 122 to the egress point. Router 102 can provide ingress and egress for client system 110. Similarly, router 104 can provide ingress into and egress out of the AS 108 for requests from client system 112. Router 106 can provide ingress into and egress out of the AS 108 for requests from both of client systems 114 and 116.

Figure 2:
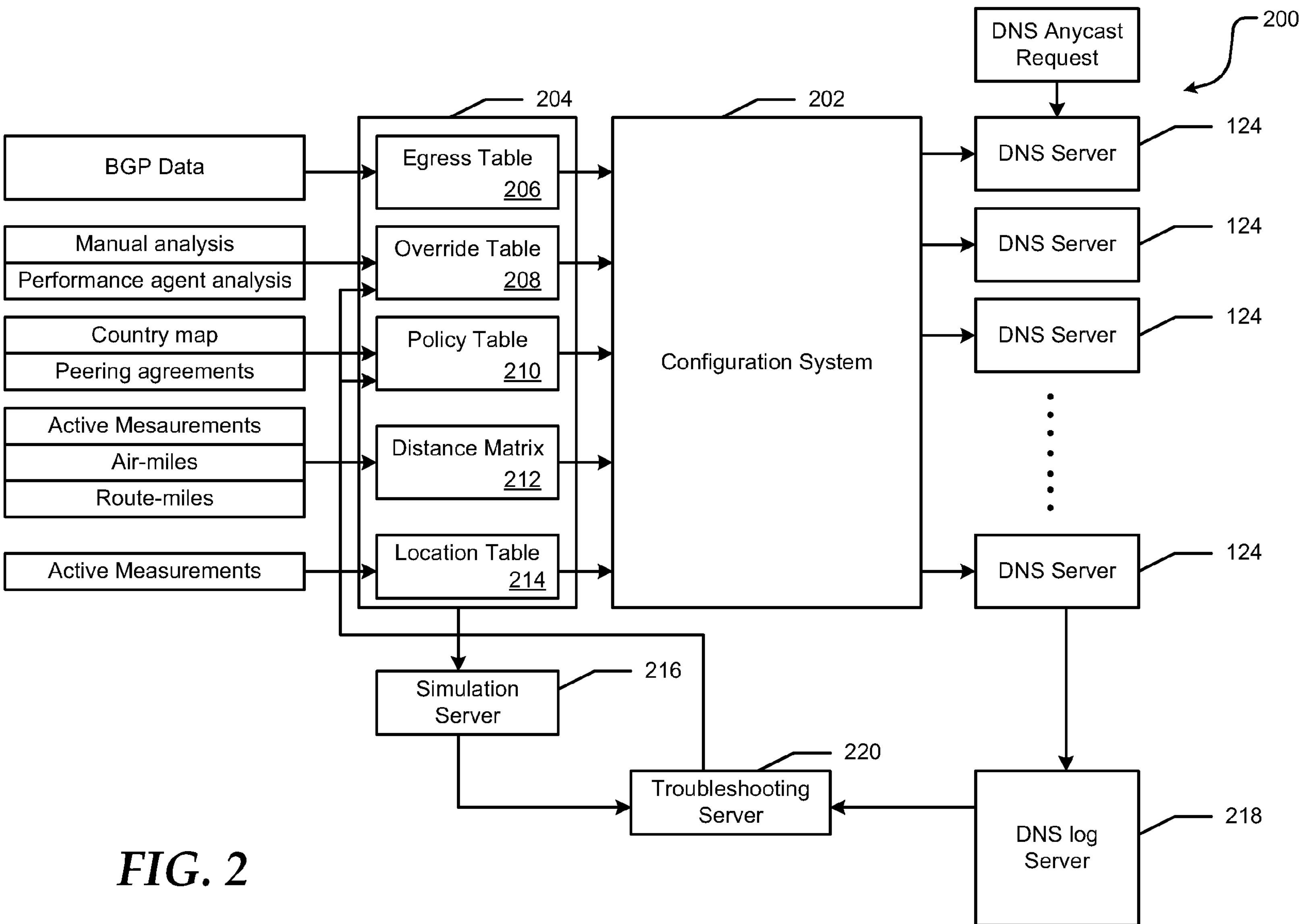
FIG. 2 is a diagram illustrating a system architecture of the CDN.

FIG. 2 shows a block diagram of system architecture 200 for providing the DNS servers 124 with configuration information, which can be used by the DNS servers while assigning cache servers with an administrative domain to client systems. An administrative domain can be an AS that can have a service region of a particular content provider. The system architecture 200 includes a configuration system 202, and a server 204. The server 204 can create an egress table 206, an override table 208, a policy table 210, a distance matrix 212, and a location table 214. The system architecture 200 can also include a simulation server 216, a DNS log server 218, and a troubleshooting server 220. Each of the DNS servers 124 is in communication with the configuration system 202, which in turn is in communication with the server 204. Each of the DNS servers 124 is in communication with the DNS log server 218, which in turn is in communication with the troubleshooting server 220. The server 204 is also in communication with the simulation server 216, which in turn is in communication with the troubleshooting server 220. The server 204 is also in communication with the troubleshooting server 220.

The server 204 can receive border gateway protocol (BGP) data, and can utilize the BGP data to generate egress tables 206 for each administrative domain. The server 204 can extract a list of IP prefixes that request content from the CDN 100 from the BGP data. The server 204 can then map, within the egress table 206, each IP prefix to one or more available egress regions for that IP prefix. For example, if a request is received from a device having an IP address that matches the prefix 12.29.206.0/23 then Philadelphia Pa. can be assigned as the egress region for the request based on the egress table 206. However, if the DNS servers 124 cannot determine a feasible egress region, a fallback prefix 0.0.0/0 can be matched and egress can be assumed to be available in every region, such that the ingress region can be assigned as the egress region to create the optimal path in the CDN 100. Ingress regions and egress regions can refer to regions within the AS 108 or administrative domain of a content provider that can communicate with an AS of another content provider. The prefixes in the egress table indicate which egress regions can service a request from an IP address that matches a prefix in the egress table, as shown in Table 1.

TABLE 1

| Egress Regions | |
|---|---|
| Prefix | Available Regions |
| 24.93.32.0/19 | Washington, DC<br>San Francisco, CA<br>New York, NY<br>Dallas, TX<br>Chicago, IL<br>Atlanta, GA<br>Seattle, WA<br>Los Angeles, CA |
| 148.128.206.0/23 | Cambridge, MA |
| 12.29.206.0/23 | Philadelphia, PA |
| 0.0.0.0/0 | ALL REGIONS |

The server 204 can create the override table 208 to cause the DNS servers 124 to route requests in a desired way that would not be selected under a normal selection process. The server 204 can receive manual override data from an administrator to create the override table 208. There can be two types of overrides in the override table 208: a static egress override and a static ingress override. The static egress override can assign available egress regions for a prefix. In an embodiment, the server 204 can assign multiple egress regions to a specific prefix of the static egress override, such that the location of the ingress region can still influence the egress region selected. For example if the override table 208 includes a static egress override having multiple egress regions, such as New York City and Los Angeles, for prefix 208.116.128.0/24, then the closest egress region can be selected between only New York City and Los Angeles based on the detected ingress region. In another embodiment, the server 204 can force an egress region selection to a particular egress in the override table 208 by assigning only a single egress for an IP prefix. The server 204 can assign a static ingress override by assigning a single ingress region for a particular prefix. The static ingress override can cause an egress region to be selected based on the single ingress region assigned. For example a particular ingress region, such as New York City, can be forced by the override table 208 assigning the ingress region of New York City for prefix 84.235.7.0/24, as shown in Table 2, such that an egress region of a request from a client system with an IP address within that prefix is based on the ingress region being in New York City even if the client system in not in New York City.

TABLE 2

| Ingress/Egress Overrides | | | |
|---|---|---|---|
| Prefix | Override Type | Override | Administrative Domain |
| 84.235.7.0/24 | INGRESS | NYC | A |
| 12.45.0.0/16 | EGRESS | London | B |
| 208.116.128.0/24 | EGRESS | NYC, LA | A |
| 206.64.118.150/32 | INGRESS | LA | A |

The server 204 can receive information, such as a country map, peering agreements, and the like, to create the policy table 210. The policy table 210 can include control parameters for the DNS servers 124 such as a modification of egress rankings, a modification of the egress availability for specific prefixes, a modification of the location table 214 to change the preference of content nodes for each region, and the like. The egress rankings can rank whether a particular egress region may be selected for a given ingress region. The egress ranking can be created based on distances between the ingress region and the regress region, a load on the egress region, and the like. The egress rankings can be modified by increasing a distance from an ingress region to an egress region to reduce the possibility that the egress region is selected for the ingress region. The egress availability can be set such that the DNS server 124 can only consider an egress router for the client system if the IP address of the client system matches prefixes listed in the policy table 210. The policy table 210 can also set another administrative domain or content delivery network for servicing a request from the client system if the IP address of the client system does not match prefixes listed in the policy table.

The server 204 can create the distance matrix 212 to store distances between each egress region and each ingress region for each administrative domain. The server 204 can utilize network distance, active measurements, air-miles, and the like along with any desired network policies to construct the distance matrix 212. In an embodiment, air-miles between an ingress region and an egress region can be used by the server 204 to calculate the distance between the ingress region and the egress region. Each egress region can be ranked for each ingress region based on the distance between the egress region and the ingress region. If more than one egress region has the same distance for a specific ingress region, the DNS server 124 can select the egress by alphabetical order from the egresses with equal distances.

The simulation server 216 can obtain the egress table 206, the override table 208, the policy table 210, the distance matrix 212, and the location table 214 from the server 204. The simulation server 216 can then simulate assigning content nodes to a client system based on the egress table 206, the override table 208, the policy table 210, the distance matrix 212, and the location table 214. The results of the DNS server simulations can be sent to the troubleshooting server 220, which can determine whether changes to the override table 208 or the policy table 210 need to be made. For example, if the simulation server 216 uses the tables from the server 204 and simulates that a request from an IP address of a client system is assigned to the wrong ingress region, egress region, or content node, the troubleshooting server 220 can determine that the override table 208 should be changed to remove the egress region for a particular prefix.

After the configuration system 202 has obtained the egress table 206, the override table 208, the policy table 210, the distance matrix 212, and the location table 214, the configuration system can covert the tables into configuration files and send the configuration files to each of the DNS servers 124. The configuration system 202 can receive the override table 208 from the server 204, and can push the override table to each of the DNS servers 124. Each DNS server 124 can know the administrative domain for itself, and only apply the override table 208 if the administrative domain of the override matches the administrative domain of the DNS server. When any DNS anycast request for a domain is made, the DNS anycast request is routed to the DNS server 124 closest to the client system or local DNS server making the anycast request. The DNS server 124 can then use the configuration files from the configuration system 202 to map an ingress region, an egress region, and a content node to service the request from the client system.

When the DNS server 124 has completed mapping the domain request, the DNS server can send information about the mapping of the domain request to the DNS log server 218. The information can indicate the IP address of the client system making the domain request, the ingress region assigned to the request, the egress region assigned to the request, and a virtual IP address of the content node assigned to the request. The DNS log server 218 can compile the information from each of the DNS servers 124 as DNS logs, and can send the DNS logs to the troubleshooting server 220. The troubleshooting server 220 can each analyze the DNS logs to determine whether a change should be made to one of the tables in server 204. The troubleshooting server 220 can determine whether changes should be made to how the egress regions are assigned by the DNS servers 124, and can determine whether changes should be made to how the ingress regions are detected by the DNS servers 124. If a change should be made, the troubleshooting server 220 can cause the server 204 to make a change to one or more of the tables.

Figure 3:
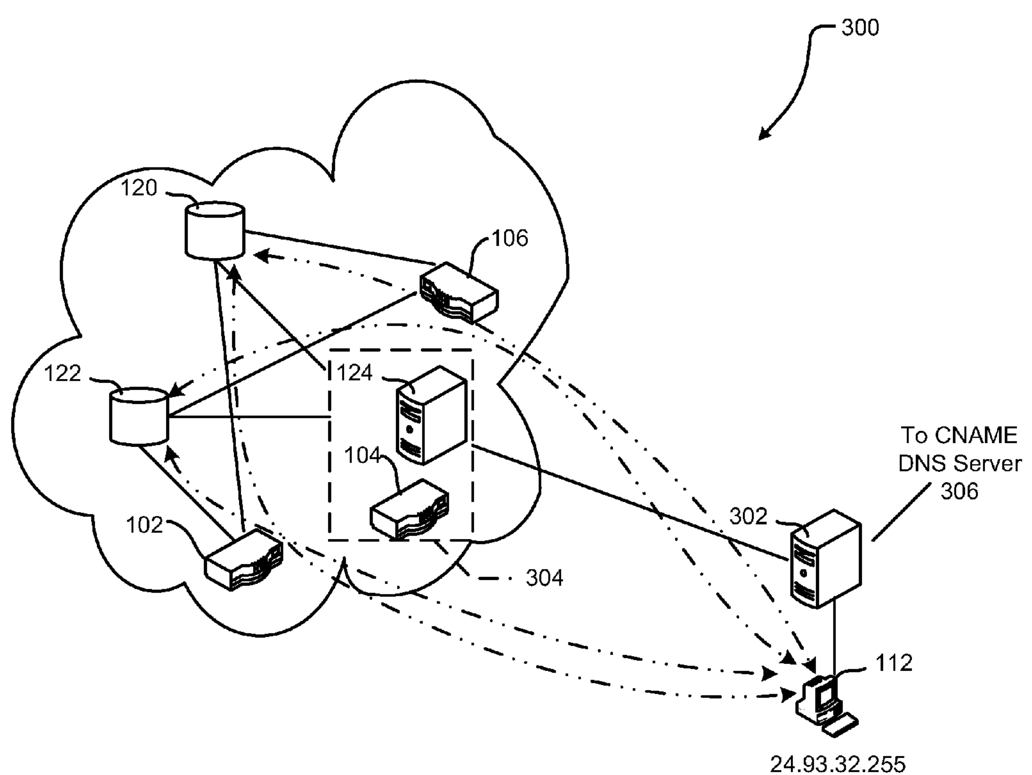
FIG. 3 is a diagram illustrating the CDN in accordance with another embodiment of the present disclosure.

FIG. 3 shows a geographically dispersed network 300 including a local DNS server 302 and an authoritative DNS server, such as DNS server 124, the client system 112, the routers 102, 104, and 106, and the cache server nodes 120 and 122. The client system 112 can communicate with the local DNS sever 302, which in turn can communicate with the authoritative DNS server 124. The authoritative DNS server 124 can be co-located at ingress location 304 with router 104, which can be the ingress router for anycast requests sent to the authoritative DNS server. The authoritative DNS server 124 can also be in communication with the routers 102 and 104, and with the cache server nodes 120 and 122.

The client system 112 can send a request to the local DNS server 302 to resolve a domain name to an IP address. The local DNS server 302 can query a root DNS server (not shown), which can redirect the query to the authoritative DNS server 124. The local DNS server 302 can then query the authoritative DNS server 124 to resolve the domain into an IP address. The authoritative DNS server 124 can receive the IP address of the local DNS server 302, such as 24.93.32.255. The client system can be a personal computer, a tablet computer, a smart cellular telephone, or the like. The authoritative DNS server 124 can then determine whether it is in a primary administrative domain for the client system. A primary administrative domain can be a North American AS, a Europe Middle East and Africa (EMEA) AS, Asia Pacific (APAC) AS, or the like. The authoritative DNS server 124 can be in the primary administrative domain if the local DNS server is in the same AS. For example, the local DNS server of the client system 112 can be located in Canada, and the authoritative DNS server 124 can be located in the AS for North America. In this situation, the authoritative DNS server 124 is in the primary administrative domain of the client system 112. However, if the client system 112 is located in Canada and the authoritative DNS server 124 is located in Germany, the authoritative DNS server would not be in the primary administrative domain of the client system.

If the authoritative DNS server 124 is not in the primary administrative domain, the authoritative DNS server 124 can retrieve the policy table 210 as shown in FIG. 2. The authoritative DNS server 124 can then determine whether the IP address for the client system 112 is within an available service prefix listed in the policy table. For example, the DNS server can utilize the policy table to determine whether the IP address of the client system 112 matches a prefix that the DNS server can service based on policy information. If the IP address for the client system is not in the available service prefixes, then the authoritative DNS server 124 can return a canonical name (CNAME) redirection to the local DNS server 302. As with the above example, if the client system 112 is in Canada, the authoritative DNS server 124 is in Germany, and the IP address for the client does not match an available service prefix, the authoritative DNS server cannot service the request based on the policy table. The authoritative DNS server 124 can then return a CNAME redirection for an anycast server 306 in the administrative domain associated with the IP of the client system.

If the IP address of the client system 112 is in the available service prefix, then the authoritative DNS server can determine whether the IP address of the client system matches an IP prefix for ingress override. The authoritative DNS server 124 can use the override table 208, as shown in FIG. 2, to make the determination. If the IP address of the client system 112 matches a prefix for ingress override, then the authoritative DNS server 124 can assign an ingress region listed in the ingress override as the ingress region of the request. Otherwise, the authoritative DNS server 124 can assign its the location as the ingress region. The authoritative DNS server 124 can then determine whether the IP address of the client system 112 matches a prefix for an egress override. If the IP address of the client system 112 matches the egress override, the authoritative DNS server 124 can assign an egress region listed in the egress override as the egress region for the request. However, if the IP address of the client system 112 does not match a prefix in the egress override, the authoritative DNS server 124 can obtain the egress table 206 as shown in FIG. 2. The authoritative DNS server 124 can perform a longest prefix match of the IP address of the client system 112 based on the egress table.

The authoritative DNS server 124 can then determine whether egress is available for the client system 112 based on the longest prefix match. If an egress is available, the authoritative DNS server 124 can receive the distance matrix 212, as shown in FIG. 2, and can select a closest available egress region. The authoritative DNS server 124 can select the closest available egress region based on the distance matrix, the longest prefix match in the egress table, and the like. The authoritative DNS server 124 can also receive the location table 214 as shown in FIG. 2. The authoritative DNS server 124 can select a content node, such as cache server node 120 or 122, based on the egress region and the location table 214, and can return a virtual IP address for the content node to the local DNS server 302. The client system 112 can then connect to and receive the requested content from either cache server node 120 or 122 based on the virtual IP address obtained.

Figure 4:
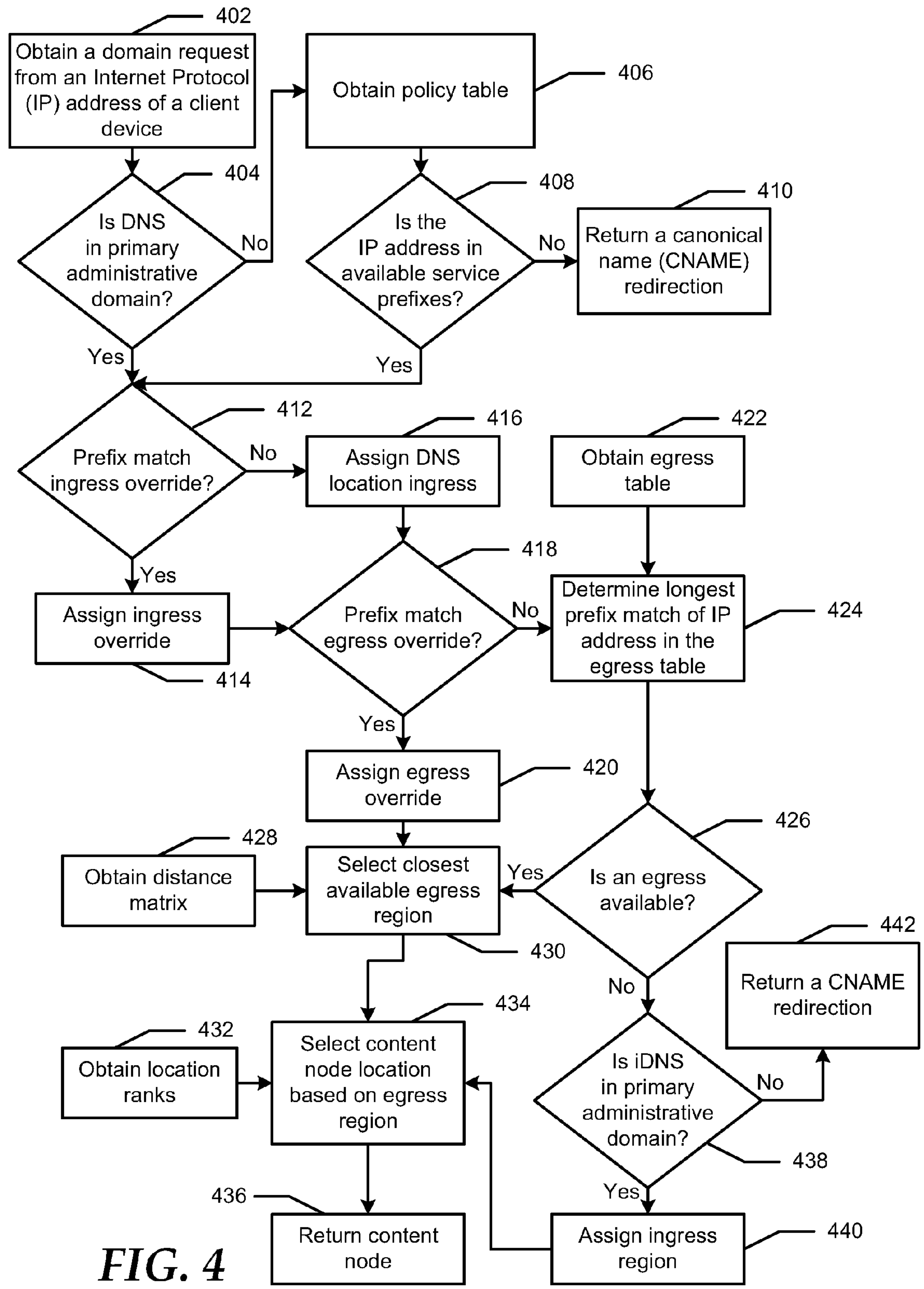
FIG. 4 is a flow diagram illustrating a method for assigning a content cache server to a client system.

FIG. 4 illustrates a method for assigning cache servers, such as cache server 120, to client system, such as client system 112. At block 402, an IP address of a client system associated with a request for a domain name is obtained at a DNS server. The client system can be a personal computer, a tablet computer, a smart cellular telephone, or the like. At block 404, a determination is made whether the DNS server is in a primary administrative domain. The DNS server can be in the primary administrative domain if the DNS server is in the AS as the client system. For example, the DNS server can in the primary administrative domain if the client system is located in Canada, and the DNS server is located in the AS for North America. However, if the client system is located in Canada and the DNS server is located in Germany, the DNS server would not be in the primary administrative domain.

If the DNS server is in the primary administrative domain, the flow continues at block 412, otherwise a policy table is obtained at block 406. The policy table can be based on peering agreements, and can modify egress rankings, modify the egress availability for specific prefixes, modify a location table to change the preference of nodes for each region, and the like. At block 408, a determination is made whether the IP address for the client system is an available service prefix based on the policy table. For example, the DNS server can utilize the policy table to determine whether the IP address of the client system is listed within an IP prefix that the DNS server can service based on policy information. If the IP address for the client system is not in the available service prefixes, then a CNAME redirection is returned to the client system at block 410. As with the above example, if the client system is in Canada, the DNS server is in Germany, and the IP address for the client is not an available service prefix, the DNS server cannot service the request based on the policy table. The DNS server can then return a CNAME redirection to an anycast server in the administrative domain associated with the AS of the client system.

If the IP address is in the available service prefix, a determination is made whether the IP address matches a prefix of an ingress override at block 412. If the IP address matches the prefix of the ingress override, then the ingress override is assigned as the ingress region of the request at block 414, otherwise the location of the DNS server is assigned as the ingress region at block 416. At block 418, a determination is made whether the IP address matches a prefix of an egress override. If the IP address of the client system matches the prefix of the egress override, the egress override is assigned as the egress region at block 420, and the flow continues at block 430. If the IP address does not match the prefix of the egress override, an egress table is obtained at block 422 and a longest prefix match of the IP address is determined based the egress table at block 424. The egress table can assign different egress regions based on a prefix listed in the egress table.

At block 426, a determination is made whether an egress is available for the client system. If egress is available for the client system, a distance matrix is obtained at block 428, and a closest available egress region is selected at block 430. The closest available egress region can be selected based on the distance matrix, the longest prefix match in the egress table, and the like. Location ranks are obtained at block 432. At block 434, a content node is selected based on the egress region and the location ranks. A virtual IP address for the content node is assigned at block 436. If, at block 426, an egress is not available, a determination is made whether the DNS is in the primary administrative domain at block 438. If the DNS is in the primary administrative domain, an ingress region is assigned at block 440, and the flow continues as stated above at block 434. If the DNS is not in the primary administrative domain, a CNAME redirection is returned at block 442.

Figure 5:
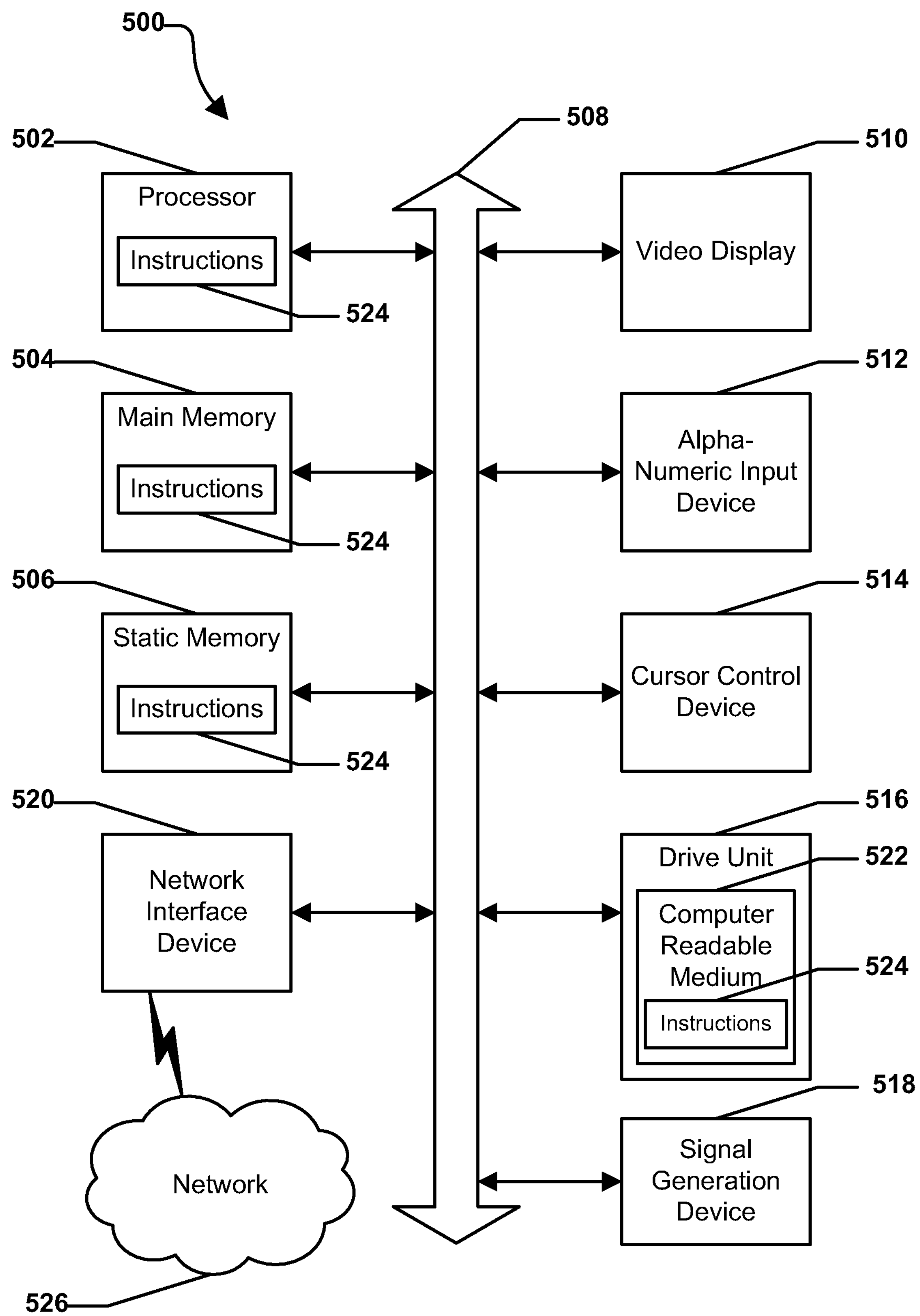
FIG. 5 is an illustrative embodiment of a general computer system.

FIG. 5 shows an illustrative embodiment of a general computer system 500. The computer system 500 can include a set of instructions that can be executed to cause the computer system to perform any one or more of the methods or computer based functions disclosed herein. The computer system 500 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term “system” shall also be taken to include any collection of systems or sub-systems that individually or jointly execute a set, or multiple sets, of instructions to perform one or more computer functions.

The computer system 500 may include a processor 502, such as a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510 such as a liquid crystal display (LCD), an organic light emitting diode (OLED), a flat panel display, a solid state display, or a cathode ray tube (CRT). Additionally, the computer system 500 may include an input device 512 such as a keyboard, and a cursor control device 514 such as a mouse. The computer system 500 can also include a disk drive unit 516, a signal generation device 518 such as a speaker or remote control, and a network interface device 520 to communicate with a network 526. In a particular embodiment, the disk drive unit 516 may include a computer-readable medium 522 in which one or more sets of instructions 524, such as software, can be embedded. The computer-readable medium can be a non-transitory computer readable medium, such as a hard disk drive, a flash memory, a read-only memory, a compact disk, a digital versatile disk, a cache, a random-access memory, and the like. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGS. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. An authoritative domain name system server comprising:

a memory configured to store a set of instructions; and a hardware processor in communication with the memory, wherein the processor executes the set of instructions to perform operations comprising:

obtaining a first internet protocol address of a client system associated with a request for a domain name;

assigning a location of the authoritative domain name system server as an ingress region;

determining whether the first internet protocol address matches a prefix of an egress override;

assigning the egress override as an egress region when the first internet protocol address matches the prefix of the egress override, otherwise obtaining an egress table, determining a longest prefix match of the first internet protocol address, obtaining a distance matrix for distances from the ingress location to a plurality of egress regions, and selecting one of the egress regions based on the distance matrix and the longest prefix match in the egress table;

selecting a content node based on the one egress region; and assigning a second internet protocol address for the content node to a local domain name system server associated with the client system.

2. The authoritative domain name system server of claim 1, wherein the operations further comprise:

determining whether the first internet protocol address matches a prefix ingress override when the authoritative domain name system server is in the primary administrative domain; and if the first internet protocol address matches the prefix ingress override, assigning the ingress override as the ingress region of the request.

3. The authoritative domain name system server of claim 1, wherein the operations further comprise:

obtaining a policy table when the authoritative domain name system server is not in the primary administrative domain;

determining whether the first internet protocol address is within an available service prefix based on the policy table; and returning a canonical name redirection to the local domain name system associated with the client system when the first internet protocol address is not in the available service prefixes.

4. The authoritative domain name system server of claim 3, wherein determining whether the first internet protocol address is within an available service prefix based on the policy table includes utilizing the policy table to determine whether the first internet protocol address matches a list of internet protocol addresses that the authoritative domain name system server can service based on policy information.

5. The authoritative domain name system server of claim 3, wherein the policy table is based on peering agreements, and the policy table modifies egress rankings, modifies the egress availability for specific prefixes, and modifies a location table to change the preference of nodes for each region.

6. The authoritative domain name system server of claim 1, wherein the client system is selected from a group consisting of a personal computer, a tablet computer, and a smart cellular telephone.

7. The authoritative domain name system server of claim 1, wherein the operations further comprise:

determining whether the authoritative domain name system server is in the primary administrative domain of the client system when egress is not available; and if the domain name system server is in the primary administrative domain, assigning the ingress region, otherwise returning a canonical name redirection to the local domain name system associated with the client system.

8. An authoritative domain name system server comprising:

a memory configured to store a set of instructions; and a hardware processor in communication with the memory, wherein the processor executes the set of instructions to perform operations comprising:

obtaining a first internet protocol address of a client system associated with a request for a domain name;

determining whether the authoritative domain name system server is in a primary administrative domain of the client system;

if the authoritative domain name system server is in the primary administrative domain, determining whether the first internet protocol address matches a prefix of an ingress override;

if the first internet protocol address matches the prefix of an ingress override, assigning the ingress override as an ingress region of the request, otherwise assigning a location of the authoritative domain name system server as the ingress region;

determining whether the first internet protocol address matches a prefix of an egress override;

if the first internet protocol address matches the prefix of the egress override, assigning the egress override as an egress region, otherwise obtaining an egress table, determining a longest prefix match of the first internet protocol address, obtaining a distance matrix for distances from the ingress location to a plurality of egress regions, and selecting one of the egress regions based on the distance matrix and the longest prefix match in the egress table;

selecting a content node based on the one egress region; and assigning a second internet protocol address for the content node to a local domain name system server associated with the client system.

9. The authoritative domain name system server of claim 8, wherein the operations further comprise:

if the authoritative domain name system server is not in the primary administrative domain, obtaining a policy table;

determining whether the first internet protocol address is within an available service prefix based on the policy table; and if the first internet protocol address is not in the available service prefixes, returning a canonical name redirection to the local domain name system associated with the client system.

10. The authoritative domain name system server of claim 9, wherein determining whether the first internet protocol address is within an available service prefix based on the policy table includes utilizing the policy table to determine whether the first internet protocol address matches a list of internet protocol addresses that the authoritative domain name system server can service based on policy information.

11. The authoritative domain name system server of claim 9, wherein the policy table is based on peering agreements, and the policy table modifies egress rankings, modifies the egress availability for specific prefixes, and modifies a location table to change the preference of nodes for each region.

12. The authoritative domain name system server of claim 8, wherein the client system is selected from a group consisting of a personal computer, a tablet computer, a smart cellular telephone, and a local domain name system server.

13. The authoritative domain name system server of claim 8, wherein the operations further comprise:

if egress is not available for the client system, determining whether the authoritative domain name system server is in the primary administrative domain of the client system; and if the domain name system server is in the primary administrative domain, assigning the ingress region, otherwise returning a canonical name redirection to the local domain name system associated with the client system.

14. A method of assigning a content node for a request from a client system, the method comprising:

obtaining, at an authoritative domain name system server, a first internet protocol address of the client system associated with the request for a domain name;

determining whether the authoritative domain name system server is in a primary administrative domain of the client system;

if the authoritative domain name system server is in the primary administrative domain, determining whether the first internet protocol address matches a prefix of an ingress override;

if the first internet protocol address matches the prefix of the ingress override, assigning the ingress override as an ingress region of the request, otherwise assigning a location of the authoritative domain name system server as the ingress region;

determining whether the first internet protocol address matches a prefix of an egress override;

if the first internet protocol address matches the prefix of the egress override, assigning the egress override as an egress region, otherwise obtaining an egress table, determining a longest prefix match of the first internet protocol address, obtaining a distance matrix for distances from the ingress location to a plurality of egress regions, and selecting one of the egress regions based on the distance matrix and the longest prefix match in the egress table;

selecting a content node based on the one egress region; and assigning a second internet protocol address for the content node to a local domain name system server associated with the client system.

15. The method of claim 14, further comprising:

if the authoritative domain name system server is not is the primary administrative domain, obtaining a policy table from a configuration system;

determining whether the first internet protocol address is within an available service prefix based on the policy table; and if the first internet protocol address is not in the available service prefixes, returning a canonical name redirection to the local domain name system associated with the client system.

16. The method of claim 15, wherein determining whether the first internet protocol address is within an available service prefix based on the policy table includes utilizing the policy table to determine whether the first internet protocol address matches a list of internet protocol addresses that the authoritative domain name system server can service based on policy information.

17. The method of claim 15, wherein the policy table is based on peering agreements, and the policy table modifies egress rankings, modifies the egress availability for specific prefixes, and modifies a location table to change the preference of nodes for each region.

18. The method of claim 14, wherein the client system is selected from a group consisting of a personal computer, a tablet computer, and a smart cellular telephone.

19. The method of claim 14, further comprising:

if egress is not available for the client system, determining whether the authoritative domain name system server is in the primary administrative domain of the client system; and if the domain name system server is in the primary administrative domain, assigning the ingress region, otherwise returning a canonical name redirection to the local domain name system associated with the client system.

* * * * *